US008997553B2

(12) United States Patent
McGregor

(10) Patent No.: US 8,997,553 B2
(45) Date of Patent: Apr. 7, 2015

(54) LEAK TESTING DEVICE AND METHOD

(75) Inventor: Stephen Kent McGregor, Harrison, OH (US)

(73) Assignee: Cincinnati Test Systems, Inc., Harrison, OH (US)

( * ) Notice: Subject to any disclaimer, the term of this patent is extended or adjusted under 35 U.S.C. 154(b) by 318 days.

(21) Appl. No.: 13/446,237

(22) Filed: Apr. 13, 2012

(65) Prior Publication Data

US 2012/0260722 A1 Oct. 18, 2012

Related U.S. Application Data

(60) Provisional application No. 61/475,407, filed on Apr. 14, 2011.

(51) Int. Cl.
*G01M 3/04* (2006.01)
*G01M 3/20* (2006.01)
*G01M 3/22* (2006.01)
*G01M 3/00* (2006.01)

(52) U.S. Cl.
CPC .............. *G01M 3/207* (2013.01); *G01M 3/007* (2013.01); *G01M 3/20* (2013.01); *G01M 3/00* (2013.01); *G01M 3/22* (2013.01)

(58) Field of Classification Search
CPC ........... G01M 3/22; G01M 3/20; G01M 3/04; G01M 3/00; G01M 3/007; G01M 3/207
USPC .................................. 73/40.7, 40.5 R, 40, 52
See application file for complete search history.

(56) References Cited

U.S. PATENT DOCUMENTS

| | | | | |
|---|---|---|---|---|
| 3,762,212 A | * | 10/1973 | Morley et al. | 73/40.7 |
| 4,785,666 A | * | 11/1988 | Bergquist | 73/40.7 |
| 4,905,501 A | * | 3/1990 | Sawatani | 73/40 |
| 5,131,263 A | * | 7/1992 | Handke et al. | 73/40.7 |
| 5,513,516 A | * | 5/1996 | Stauffer | 73/49.2 |
| 5,831,147 A | * | 11/1998 | Hoath | 73/49.3 |
| 6,289,722 B1 | * | 9/2001 | Lycan et al. | 73/49.2 |
| 6,439,033 B1 | | 8/2002 | Lehmann | |
| 6,609,414 B2 | | 8/2003 | Mayer et al. | |
| 6,886,389 B1 | | 5/2005 | Hagar | |
| 2004/0144161 A1 | * | 7/2004 | Micke et al. | 73/40.7 |
| 2005/0123414 A1 | * | 6/2005 | Key et al. | 417/313 |
| 2013/0145814 A1 | * | 6/2013 | Bailey | 73/1.06 |

OTHER PUBLICATIONS

International Search Report dated Jul. 9, 2012 for Application No. PCT/US2012/033503.
International Preliminary Report on Patentability and Written Opinion dated Oct. 15, 2013 for Application No. PCT/US2012/033503.

* cited by examiner

*Primary Examiner* — Hezron E William
*Assistant Examiner* — Marrit Eyassu
(74) *Attorney, Agent, or Firm* — Frost Brown Todd LLC

(57) ABSTRACT

A leak testing device includes a body portion and a purge gas supply. The body portion defines a cavity. The cavity is operable to enclose a portion of a part to be leak tested. The body portion also comprises at least one fluid port operable to deliver a purge gas to the cavity. The purge gas supply is in fluid communication with that at least one fluid port. The purge gas supply is configured to supply a purge gas through the at least one fluid port. The purge gas is operable to purge the cavity of at least a portion of an atmospheric tracer gas contained in the cavity.

20 Claims, 14 Drawing Sheets

LEAK TESTING DEVICE AND METHOD

PRIORITY

This application claims priority to U.S. Provisional Patent Application Ser. No. 61/475,407, filed Apr. 14, 2011, entitled "LEAK TESTING DEVICE AND METHOD," the disclosure of which is incorporated by reference herein.

FIELD

Embodiments of the present invention relate, in general, to a leak testing device. In particular, it relates to a device and method of tracer gas leak testing by using a purging gas.

BACKGROUND

Leak testing is important for many applications in different industries. In some applications, for example, leak testing may be performed on a component to determine if any defects exist that may prevent the part from performing sufficiently or optimally. Thus, if any defects exist, then the part or component may be modified or replaced.

While leak testing is prevalent, some methods of leak testing perform undesirably.

For example, in some methods, a vacuum is used to remove all atmospheric air from a testing chamber containing a part to be leak tested. Once a vacuum is formed in the chamber, a tracer gas, which may be fed through the test part, is measured to determine if any leaks exist in the test part. However, this method presents issues as vacuums must be carefully controlled so as to avoid damaging the test part. Often, pressures applied by a vacuum can cause a part to collapse or fail. Some parts may simply be unable to withstand a change in pressure resulting from a vacuum.

Other methods of leak testing may include using a clamshell to enclose a part to be tested in an airtight seal. A tracer gas may be used in conjunction with the clamshell by feeding the tracer gas into the part to be tested. As the tracer gas accumulates in the clamshell as a result of a leak, a sniffer probe may be used to detect the accumulation of the tracer gas within the clamshell. Unfortunately, this method presents issues as well because the tracer gas used for the leak testing may be a recurring gas in atmospheric air. For example, helium may be used as a tracer gas; however, helium exists in atmospheric air. Thus, when the clamshell is closed, a portion of atmospheric air containing the tracer gas will inevitably remain in the clamshell. As a result, any probe or other sniffing device will not be able to detect trace levels of helium leaking from the part or component occurring in smaller quantities than helium which occurs naturally in the atmospheric air within the clamshell or outside of the clamshell. Even worse would be if tracer gas occurring in atmospheric gas causes a false positive in the leak testing.

As a result, a more desirable method and device for leak testing is needed.

BRIEF DESCRIPTION OF THE DRAWINGS

The accompanying drawings incorporated in and forming a part of the specification illustrate several aspects of the present disclosure, and together with the description serve to explain the principles of the invention; it being understood, however, that the described embodiments are not limited to the precise arrangements shown. In the drawings, like reference numerals refer to like elements in the several views. In the drawings.

DETAILED DESCRIPTION

Figure 1:
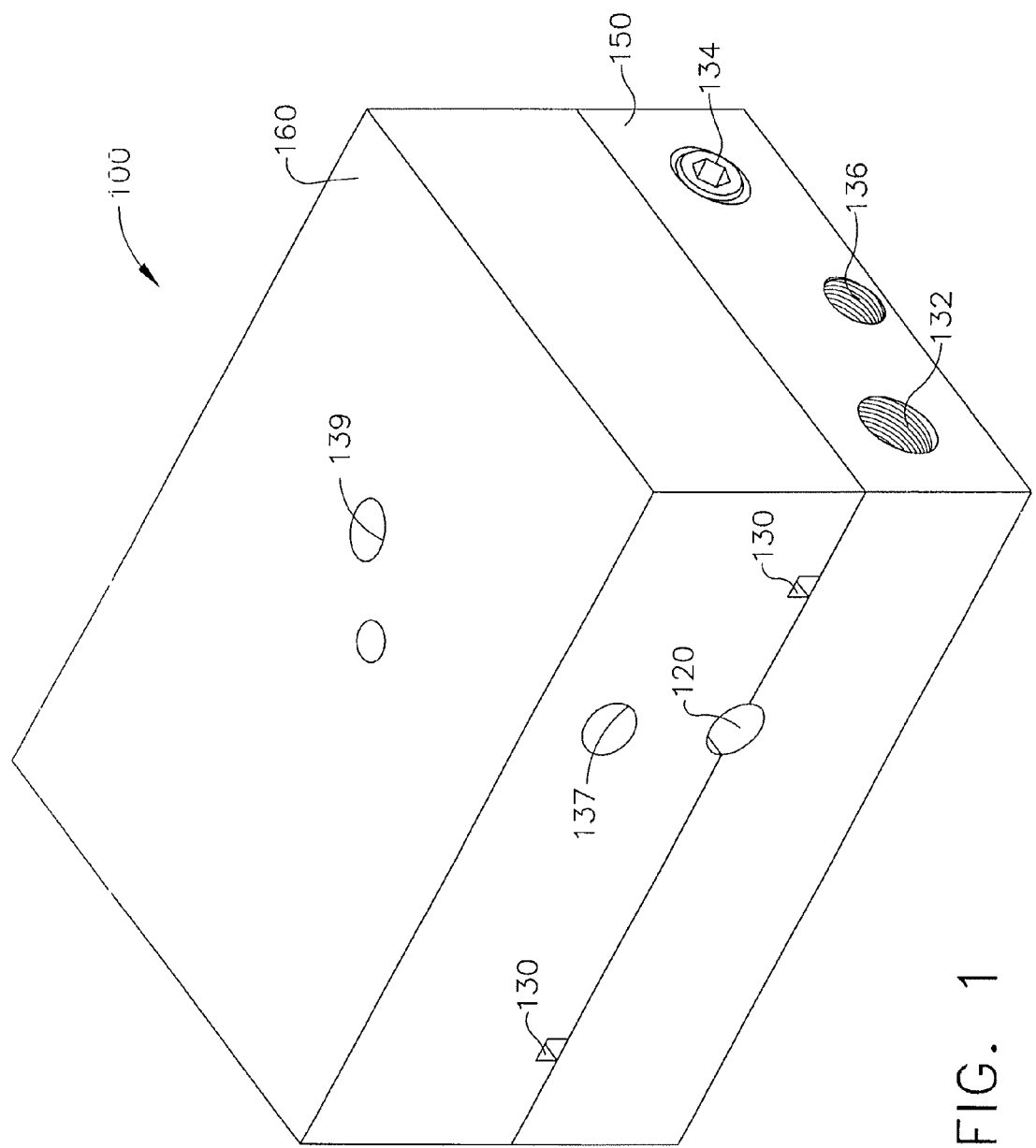
FIG. 1 depicts a perspective view of one embodiment of a leak testing device constructed in accordance with the teachings of the present invention.

The following description of certain examples should not be used to limit the scope of the present invention. Other features, aspects, and advantages of the embodiments disclosed herein will become apparent to those skilled in the art from the following description, which is by way of illustration, one of the best modes contemplated for carrying out the invention. As will be realized, the embodiments described herein are capable of other different and obvious aspects, all without departing from the invention. Accordingly, the drawings and descriptions should be regarded as illustrative in nature and not restrictive.

FIGS. 1-6 show an exemplary embodiment of leak testing device (100). Generally, leak testing device (100) may be used to test whether a part or article contains any leaks or defects. This may be accomplished generally by placing the part in leak testing device (100). Once the part is placed in leak testing device (100), atmospheric gas, which surrounds the part, is purged from leak testing device (100), as will be described in further detail below. In some embodiments, nitrogen may be used generally as the gas for purging leak testing device (100), but any suitable gas may be used for purging as would be apparent to one of ordinary skill in the art in view of the teachings herein. Once the purge gas is supplied to leak testing device (100), it will be appreciated that this act purges leak testing device (100) of most or all of the atmospheric air contained in or around the part to be tested. Additionally, a positive, generally continuous pressure may be applied by the purge gas as the purge gas is continuously supplied to leak testing device (100), which continuously flows purge gas outward from leak testing device (100), thereby preventing atmospheric or any other undesirable gas from re-entering leak testing device (100).

Once the purging is in process, a tracer gas, such as, for example, helium, may be fed internally to the part to be leak tested. If there are no leaks, then the tracer gas will not leak out of the part being tested. The presence or absence of a leak in the part being tested may be defined generally by whether or not a detectable amount of tracer gas passes from the interior of the part to the exterior of the part through the part itself. Thus, when a sniffer probe is inserted into leak testing device (100), the sniffer probe will not detect any of the tracer gas. As such, the user can verify that there is no leak. However, if the sniffer probe does detect any of the tracer gas, then the positive reading by the sniffer probe may serve as an indication of a leak present in the part being leak tested. It will be appreciated that the sensitivity of the sniffer probe can be adjusted by adjusting the sensitivity of the sensor in the sniffer probe such that only leaks of a certain size will trigger sniffer probe to report that a leak exists. For example, the sensor in the sniffer probe may be adjusted to detect a predetermined parts per million (ppm) of a tracer gas.

Alternatively, in some embodiments, rather than supplying a tracer gas through the part to be leak tested, the part, such as an enclosed part, may be placed in a separate chamber containing a tracer gas. If the part contains leaks, then at least some of the tracer gas will seep into the part to be leak tested. The part to be leak tested will then be placed into leak testing device (100). If the part leaks, the leaks will be detectable by detecting the tracer gas exiting the part. It is contemplated that the system and method described herein may work with at least either of these leak testing methods. In addition, the system and method described herein may be used with any suitable leak testing method as would be apparent to one of ordinary skill in the art in view of the teachings herein.

It will be appreciated that in many instances, atmospheric air may contain small quantities of the tracer gas. As a result, a sniffer probe can only detect amounts of tracer gas in excess concentrations of amounts contained in atmospheric air.

It will further be appreciated that the use of a purging system in accordance with the teachings of the present invention can facilitate purging leak testing device (100) of atmospheric air, which will lead to reduction or elimination of tracer gases in atmospheric gas within leak testing device (100). As a result, tracer gas within leak testing device (100) that seeps from the part can be more accurately measured, and a more sensitive sniffer probe may be used. Correspondingly, the ability to use a more sensitive sniffer probe would allow a user to detect smaller leaks in the part being tested. For example, a defect in a part that produces a much slower leak may be detectable using leak testing device (100).

It will further be appreciated that false positives are an undesirable consequence of tracer gas being present in the atmospheric air around leak testing device (100). For example, a facility where leak testing device (100) is located may contain bits of tracer gas in the surrounding air. If tracer gas from the facility somehow comes in contact with the sniffer probe while the sniffer probe is engaged with leak testing device (100), then an undesirable false positive reading could occur. This false reading might lead the user to believe that the part being leak tested contains a leak, when in fact, there is no leak. It will be appreciate that purging leak testing device (100) of tracer gas will further minimize the number of false positives as a result of atmospheric gas, or perhaps accidental discharges contained in the air around leak testing device (100).

As seen in FIG. 1, leak testing device (100) comprises base (150) and lid (160). Base (150) and lid (160) comprise a generally rectangular shape, but any suitable shape may be used as would be apparent to one of ordinary skill in the art in view of the teachings herein. For example, each of base (150) and lid (160) may comprise a spherical shape, or may be molded to match the general shape of the part being leak tested. Leak testing device (100) may be constructed of metal. For example, some embodiments of leak testing device (100) may be constructed of aluminum. However, any other suitable material may be used as would be apparent to one of ordinary skill in view of the teachings herein.

Figure 2:
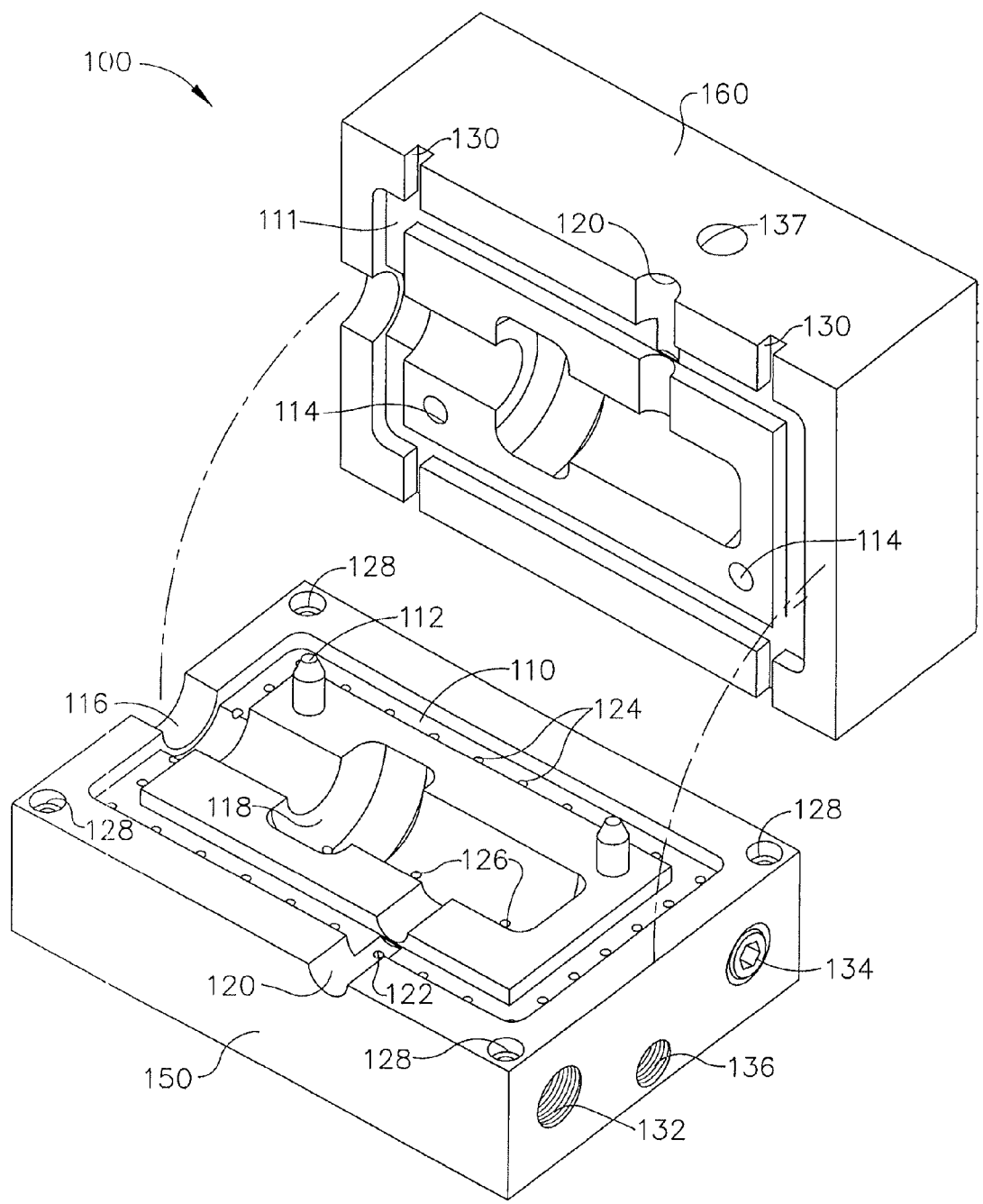
FIG. 2 depicts a perspective view of the leak testing device of FIG. 1 showing the inside of the leak testing device.

Generally speaking, base (150) and lid (160) comprise complementary construction such that base (150) and lid (160) may engage each other in a clamshell-like configuration, however, without the need to form an air-tight seal. At least one locating pin (112), as seen, for example, in FIG. 2 is positioned on base (150) in the illustrated figures. At least one locating pin (112) is shaped and positioned so as to engage at least one locating hole (114) positioned on lid (160). At least one locating pin (112) may comprise a tapered protrusion. However, any suitable shape for at least one locating pin (112) may be used as would be apparent to one of ordinary skill in the art in view of the teachings herein. As a result, the tapered shape of at least one locating pin (112) can facilitate easy guiding of at least one locating pin (112) into at least one locating hole (114). In the illustrated embodiment, two locating pins (112) and two locating holes (114) are shown, which are able to engage each other; however, any suitable number of locating pins (112) or locating holes (114) may be used such that base (150) and lid (160) may engage each other. Any suitable way of aligning base (150) and lid (160) together may be used without necessarily making use of locating pins (112) as would be apparent to one of ordinary skill in the art in view of the teachings herein.

Base (150) further comprises at least one bore (128) for use with, for example, mounting bolts to mount base (150) to a platform or any other suitable surface or structure. However, base (150) need not necessarily be mounted to anything at all. Any suitable configuration regarding placing base (150) may be used. The depicted embodiment shows four bores (128) for use with mounting bolts, but any suitable number of bores (128) may be used. Additionally, bores (128) need not be positioned near the corners as shown in the illustrated embodiments. Furthermore, any other means for attaching base (150) to a surface may be used as would be apparent to one of ordinary skill in the art in view of the teachings herein. Thus, prior to beginning the purging process and leak testing, leak testing device (100) may be stabilized by mounting base (150) by way of bores (128) and mounting bolts.

In some embodiments, rather than being mounted, leak testing device (100) may, for example, be clamped to the part to be leak tested such that leak testing device (100) is fully, or primarily supported by the part being leak tested. Thus, in such a configuration, leak testing device (100) may be wholly portable such that leak testing device (100) may be used in the field or other "on-site" environment. For example, hydraulic cylinders (not shown) may be used to facilitate clamping around a part to be leak tested.

Base (150) further comprises purge channel (110) extending around base (150). In the illustrated embodiment, purge channel (110) generally follows the shape of base (150). For example, in the illustrated embodiment, purge channel (110) comprises a continuous rectangular ring; however, any suitable shape may be used for purge channel (110) as would be apparent to one of ordinary skill in the art in view of the teachings herein.

Purge channel (110) defined in base (150) is generally mirrored along lid (160) as well such that lid (160) comprises a complementarily shaped lid channel (111). Thus, when lid (160) and base (150) engage, lid channel (111) and purge channel (110) together form a larger passageway. In the illustrated embodiment, lid channel (111) comprises plurality of purge vents (130) extending outwardly from lid channel (111). A plurality of purge vents (130) are in fluid communication with lid channel (111) as well as atmospheric air. Once lid (160) and base (150) are engaged and closed on each other, the plurality of purge vents (130) will also be in communication with purge channel (110), thus plurality of purge vents (130) can establish fluid communication between atmospheric air and purge channel (110) as well. Thus, a purge gas can fill lid channel (111) and purge channel (110) as purge gas is being supplied to leak testing device (100) and continue to urge purge gas outside of leak testing device (100) through plurality of purge vents (130).

Figure 3:
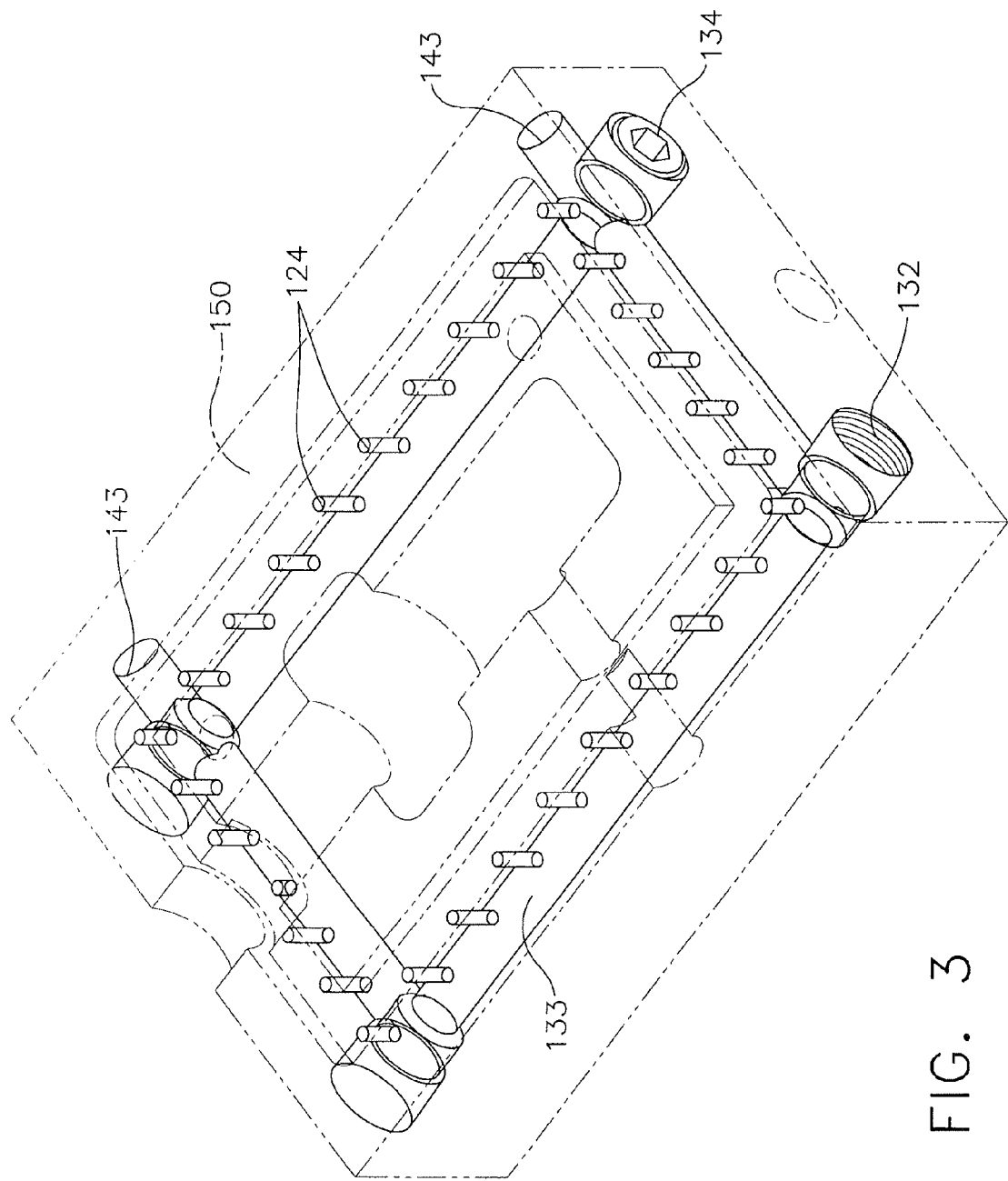
FIG. 3 depicts a perspective view of the base of leak testing device of FIG. 1 highlighting a purge ring with the body of the base shown in phantom lines and the purge ring shown in solid lines.

Purge channel (110) further comprises a plurality of spaced apart purge ports (124) extending from purge channel (110). FIG. 3 shows a view of purge ports (124), which are in fluid communication with at least one purge inlet (132) through purge ring (133). Purge ports (124) are positioned so as to be uniformly spaced along purge channel (110) and extending upwards from purge ring (133) that encircles base (150). Each purge port (124) is also positioned generally in the center of the width of purge channel (110). However, any suitable positioning and orientation of purge ports (124) may be used as would be apparent to one of ordinary skill in the art in view of the teaching herein. For example, purge ports (124) may be positioned so as to concentrate more purge ports (124) in a particular area. Purge ports (124) are in communication with at least one purge inlet (132) via purge ring (133) through which a purge gas can be received to push through a plurality of purge ports (124) as can be seen in FIG. 3. In some other embodiments, rather than plurality of purge ports (124), other means may be used to control the flow of gas out of purge channel (110). For example, a mesh screen, or layers of a fine mesh screen could be used within purge channel (110) to guide air out of purge channel (110).

Figure 4:
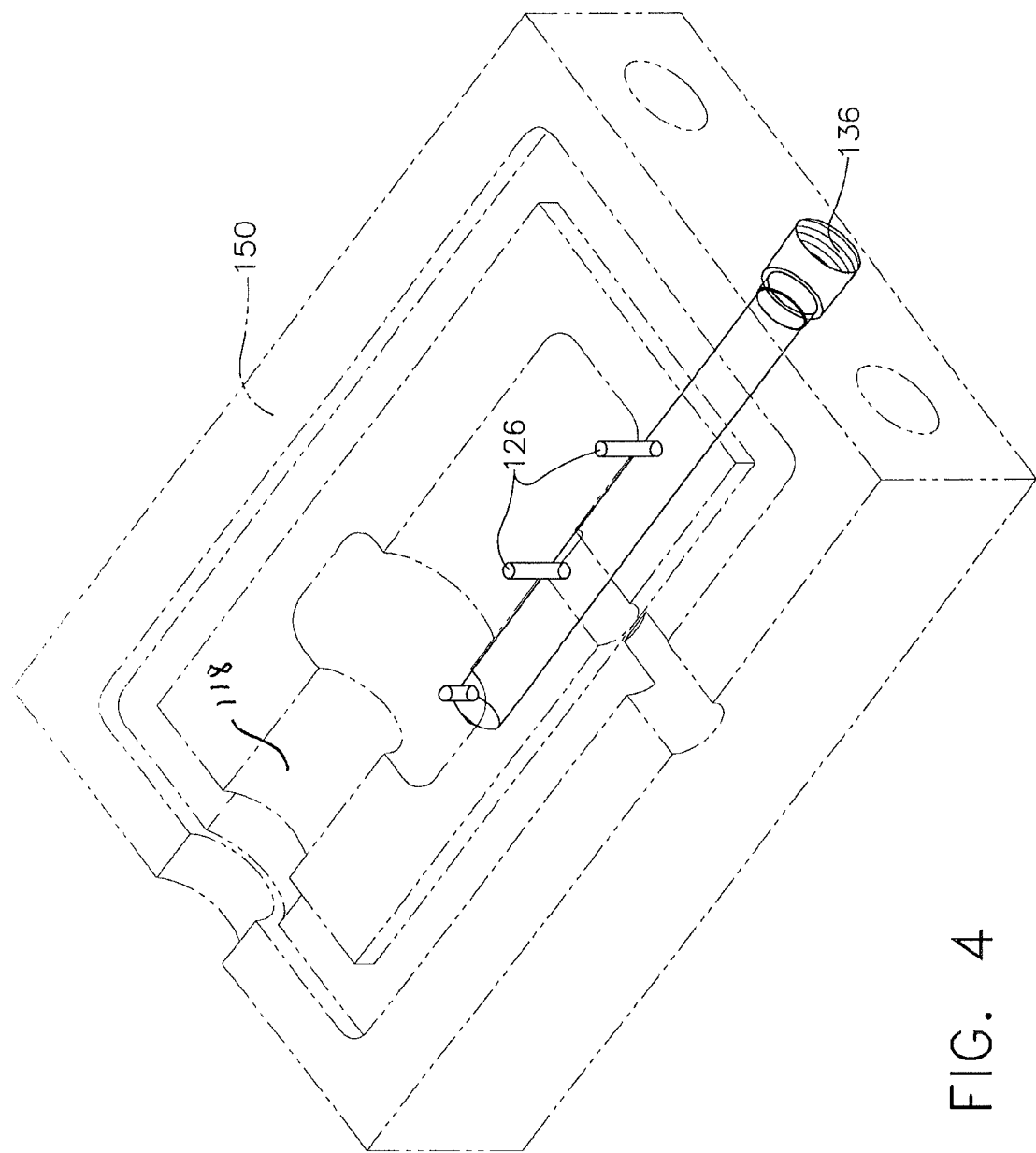
FIG. 4 depicts another perspective view of the base of leak testing device of FIG. 1 highlighting the cavity purge channel with the body of the base shown in phantom lines and the cavity purge channel shown in solid lines.

Additionally, part cavity (118) comprises at least one cavity purge port (126), which may be seen more clearly in FIG. 4. At least one cavity purge port (126) is able to inject or supply part cavity (118) with a purge gas. It will be appreciated that cavity inlet port (136) may supply a purge gas pressure of a different level from that supplied by plurality of purge ports (124). For example, at least one cavity purge port (126) may supply a purge gas at a lower pressure than the purge gas supplied by purge ports (124). Additionally, cavity purge port (126) may supply a purge gas at an equal or higher pressure in relation to plurality of purge ports (124). However, any suitable configuration for purge gas pressures may be used as would be apparent to one of ordinary skill in the art in view of the teachings herein. Furthermore, the pressure of purge gas through cavity purge port (126) may be adjusted using various flow rates. For example, the user could select an initial pressure of purge gas through cavity purge port (126) by utilizing a flow rate of 10-20 ft$^3$/hr and then subsequently lowering the pressure. In some cases, the user might completely cut off the purge gas through at least one cavity purge port or set the pressure to any other suitable pressure as would be apparent to one of ordinary skill in the art in view of the teachings herein.

Figure 5:
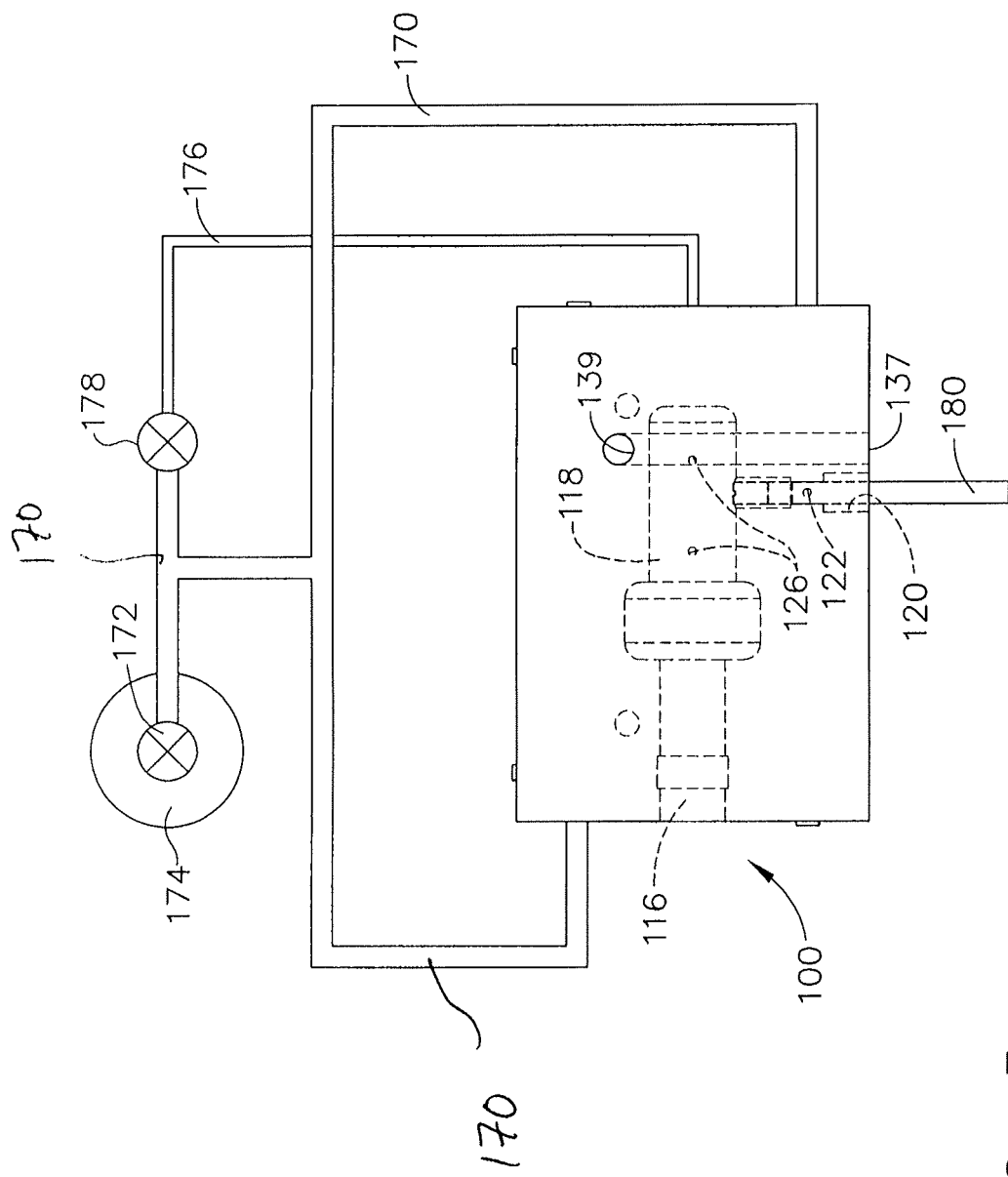
FIG. 5 depicts a diagrammatic view of a leak testing system showing the leak testing device of FIG. 1 in plan view.

Furthermore, as can be seen for example in FIG. 1, lid (160) of leak testing device (100) comprises calibration inlet (139) and calibration port (137) where calibration port (137) is in fluid communication with calibration port (137). Calibration port (137) and calibration inlet (139) are in fluid isolation from other portions of leak testing device (100) so as to allow sniffer probe (180) to properly calibrate or zero. Thus, in operation, a purge gas is fed into calibration inlet (139) while sniffer probe (180), as shown for example in FIG. 5, is inserted into calibration port (137). As a result, a reading may be taken from calibration port (137) in order to allow sniffer probe (180) to calibrate or "zero" using a supply of purge gas devoid of any tracer gas. Thereafter, sniffer probe (180) can be used to take samples to detect the presence of any tracer gas.

Returning now to FIG. 3, base (150) comprises at least one purge plug (134). In the illustrated embodiment, at least one purge plug (134) is operable to be selectively removed using a hex key, which could allow, for example, another gas source to be introduced to leak testing device (100). However, any suitable configuration to allow at least one purge plug (134) to be removed may be used as would be apparent to one of ordinary skill in the art. Furthermore, leak testing device (100) need not use at least one purge plug (134) at all. In some embodiments, openings covered by at least one purge plug (134) could instead be welded shut or connected to another purge gas source.

In operation, as a purge gas is applied through at least one purge inlet (132), purge gas is expelled out of plurality of purge ports (124) of purge channel (110). As the purge gas flows through and is expelled from purge ports (124), atmospheric gas is pushed out of leak testing device (100) through purge vents (130) as well as between base (150) and lid (160). And as the purge gas continuously flows through at least one purge inlet (132) to push the purge gas from plurality of purge ports (124), the purge gas prevents atmospheric air from reentering leak testing device (100). In fact, as the purge gas continuously flows from plurality of purge ports (124), it will be appreciated that a curtain of purge gas is created, thereby preventing the re-entry of atmospheric gas. Thus, the overall amount of tracer gas is decreased as the purge gas displaces much or all of it such that the only amount of tracer gas detectable in leak testing device (100) is a result of a leak or defect within the part being tested.

Figure 6:
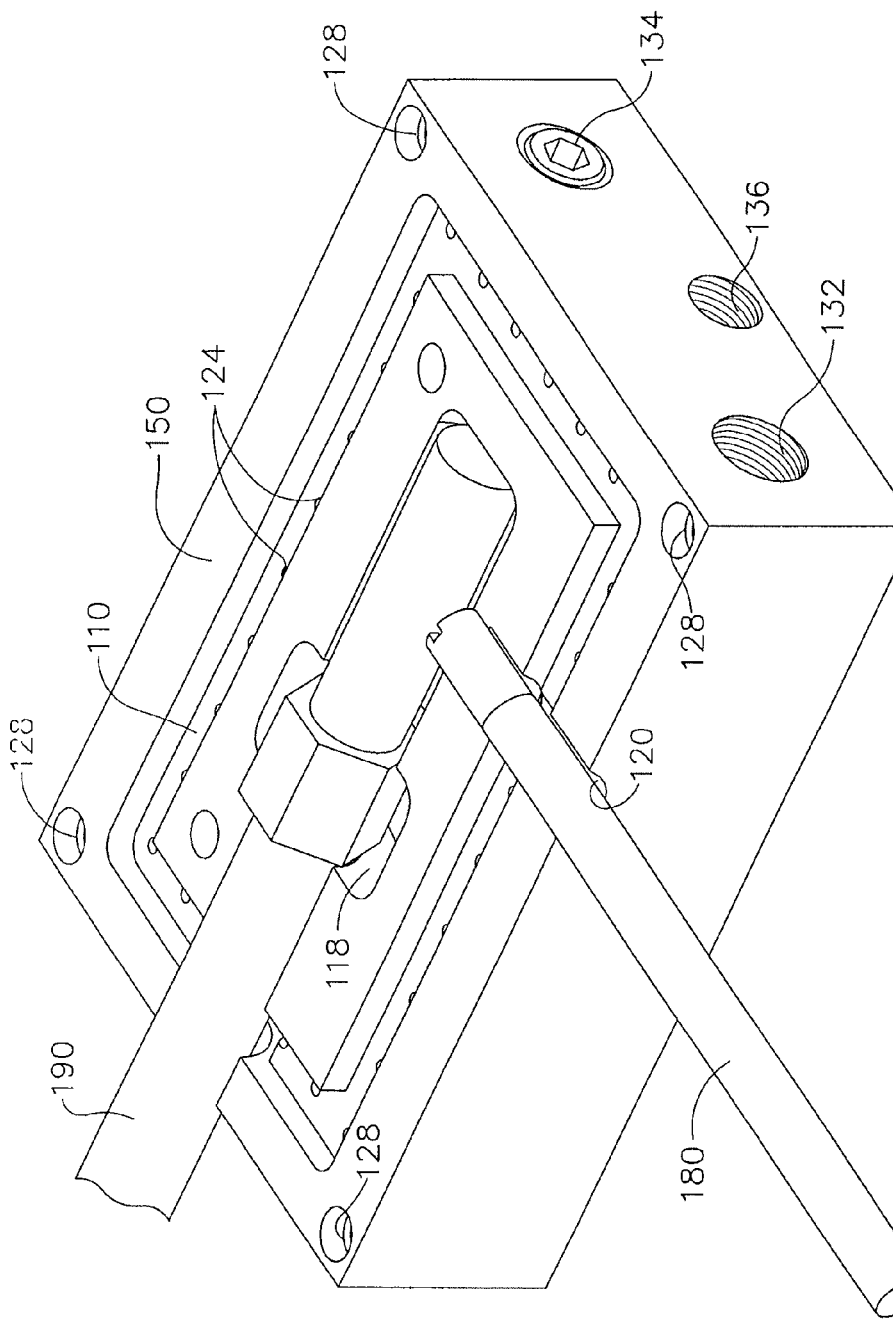
FIG. 6 depicts a perspective view of the leak testing device of FIG. 1 showing a part to be leak tested positioned within the leak testing device with a sniffer probe.

Purge gas conduit (170) shown in FIG. 5 may be connected to purge inlet (132) depicted in FIG. 6. Purge gas conduit (170) may be selectively removable from purge inlet (132). As also seen in FIG. 5, purge gas conduit (170) is connected to tank valve (172) of tank (174). While the illustrated embodiment utilizes tank (174) to supply the purge gas, any other suitable gas source delivery mechanism or system may be used. Tank valve (172) may be selectively opened or closed to control the flow of the purge gas through purge gas conduit (170) to leak testing device (100).

Additionally, cavity purge conduit (176) of FIG. 5 may be connected to cavity inlet port (136) depicted in FIG. 4. Turning to FIG. 5, cavity purge conduit (176) connects to throttle valve (178), which is in fluid communication with purge gas conduit (170). Any suitable method of fluidly connecting cavity purge conduit (176) to throttle valve (178) may be used as would be apparent to one of ordinary skill in the art.

Throttle valve (178) may be used to control the flow of a purge gas through cavity purge conduit (176). In some embodiments, throttle valve (178) may be used to direct flow through cavity purge conduit (176) that is of a lower pressure than the pressure of gas flowing in purge gas conduit (170) in order to facilitate proper purging of leak testing device (100). Various suitable pressure configurations regarding the relative pressures between purge gas conduit (170) and cavity purge conduit (176) may be used as would be apparent to one of ordinary skill in the art in view of the teachings herein. In some embodiments, tank (174) may contain nitrogen gas, but any suitable purge gas may be used as would be apparent to one of ordinary skill in the art in view of the teachings herein.

Returning to FIG. 2, at least a portion of base (150) and lid (160) are molded to define part cavity (118). As shown in the illustrated embodiment, a portion of base (150) is molded to form half of part cavity (118) whereas a portion of lid (160) is molded to form the other half of part cavity (118). Part cavity (118) is suitably shaped and sized to hold an article or a part to be leak tested. For example, if the part to be tested is cylindrically shaped, then part cavity (118) may be generally cylindrically shaped as well. Furthermore, part cavity (118) may comprise a more generic shape able to hold different parts of different shapes. Any suitable shape for part cavity (118) may be used as would be apparent to one of ordinary skill in the art in view of the teachings herein.

Part cavity (118) leads to entry lumen (116). Entry lumen (116) comprises a generally cylindrical cutout as shown in the illustrated embodiment. However, entry lumen (116) may comprise any shape so as to enclose the portion of an article extending through entry lumen (116) as the article is placed in part cavity (118). When the article is placed in part cavity (118) and base (150) and lid (160) are engaged, entry lumen (116) is shaped to gently surround the article. The fit of entry lumen (116) around the article need not necessarily be airtight or fluid-tight. However a sufficiently tight entry lumen (116) may be used which allows a consistent flow of gas through leak testing device (100) such that gas flow is not disrupted. It will be appreciated that the clearance of entry lumen (116) may vary according to the sampling rate of the sensor used with sniffer probe (180). In the illustrated embodiment, the fit between base (150) and lid (160) is not airtight. In the illustrated embodiment, entry lumen (116) extends through purge channel (110), thus a portion of purge channel (110) follows the contours of entry lumen (116). When a part to be leak tested is placed in part cavity (118), the tracer gas may be fed to the part from outside leak testing device (100). The tracer gas moves through entry lumen (116) and fills the part to be tested. In the event there are no leaks in the part being tested, tracer gas will simply remain in the part being tested, but if leaks exist, then tracer gas would leak into part cavity (118), which may then be detected using a sniffer probe or any other suitable sensor as would be apparent to one of ordinary skill in the art in view of the teachings herein.

Access port (120), as shown in the illustrated embodiment, extends outwardly from part cavity (118). Access port (120) is shaped such that a sniffer probe (180) may be inserted into access port (120) as shown in FIG. 5. Therefore, when a part is placed in part cavity (118), sniffer probe (180) may be used to sample air from part cavity (118). In fluid communication with access port (120) is access port purge port (122). A purge gas, for example, nitrogen may be supplied or injected through access port purge port (122). As shown in the illustrated embodiment, access port (120) extends through based (150) and lid (160) such that access port (120) is in communication with purge channel (110). It will be appreciated that in some cases, atmospheric air, which may include amounts of tracer gas, may surround sniffer probe (180). By expelling a purge gas through access port purge port (122), access port purge port (122) can operate to clear away atmospheric air from sniffer probe (180) as sniffer probe (180) is inserted into access port (120). It will be appreciated that this process will enable sniffer probe (180) to measure the tracer gas without potential erroneous readings that may be caused by atmospheric air that would otherwise cling to sniffer probe (180).

As an exemplary depiction, FIG. 6 shows leak testing device (100) with part (190). Part (190) has been placed in part cavity (118) for leak testing, and sniffer probe (180) has been inserted into access port (120) to suction air to determine if a tracer gas has leaked from part (190).

Figure 7:
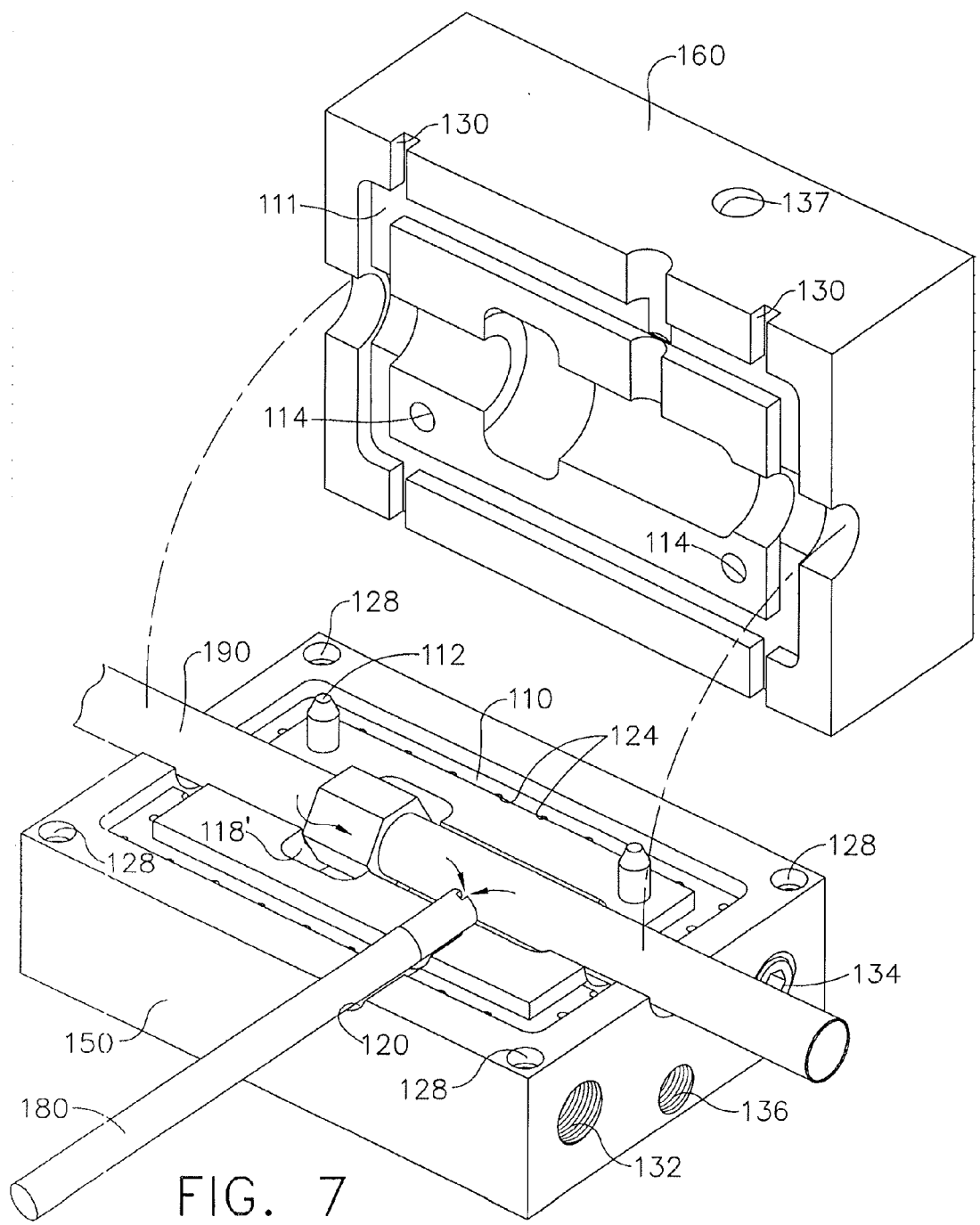
FIG. 7 depicts a perspective view of an alternative embodiment of a leak testing device constructed in accordance with the teachings of the present invention showing the part to be leak tested passing all the way through the leak testing device with a sniffer probe.

FIG. 7 shows leak testing device (100) having base (150) with part cavity (118') constructed such that part (190) can extend through the entire length of base (150). It will be appreciated that such a construction of part cavity (118') may enable leak testing device (100) to be used in situations where a typical clam shell device may not be practical such as if an entire clamshell casing cannot fit around part (190) for leak testing. As a result, it will be appreciated that leak testing device (100) may be used with contiguous parts without interrupting the part to be tested or without requiring an airtight seal. Other uses will be apparent to one of ordinary skill in the art in view of the teachings herein.

FIGS. 8-13 show an alternative embodiment of leak testing device (200), which comprises generally leak testing device (200) for leak testing part (290) by covering part (290) rather than enclosing part (290) as shown in some of the exemplary embodiments discussed above. In the illustrated embodiment, test valve (292) comprises a generally right angle oriented valve. However, test valve (292) may comprise any type of valve that may need leak testing. In addition, leak testing need not be limited to valves. Leak testing device (200) may be used to leak test various components, parts, or articles that may need leak testing.

Figure 10:
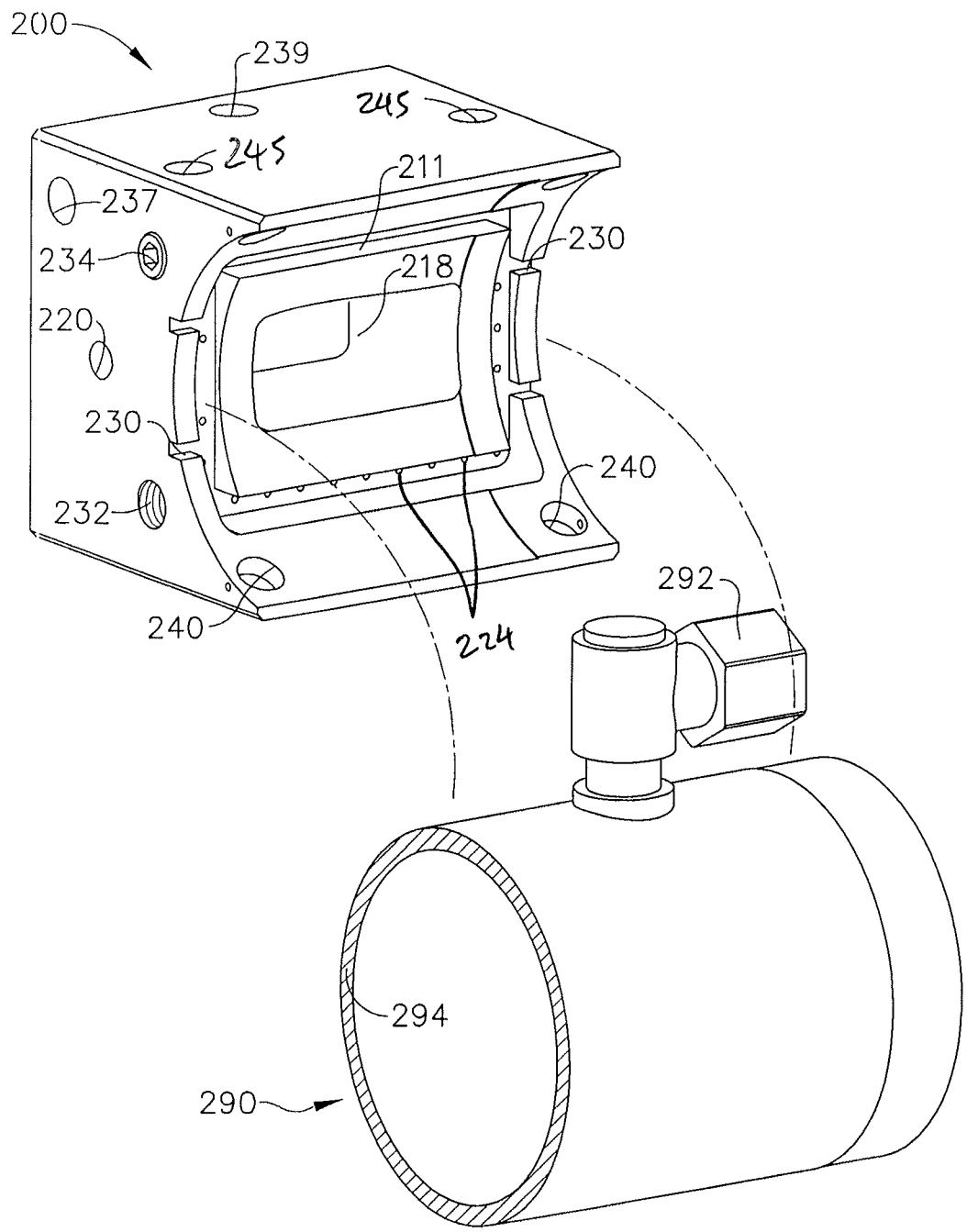
FIG. 10 depicts a perspective view of the leak testing device of FIG. 8 with the leak testing device lifted off of the part to be tested and rotated to show the bottom of the leak testing device.

Leak testing device (200) comprises a generally block-like shape having a cylindrical cutout. In the illustrated embodiment, the cylindrical cut out shape of leak testing device (200) enables leak testing device (200) to have a shape complementing the pipe (294) of part (290) to be leak tested. Thus, if pipe (294) comprises a different shape, then leak testing device (200) could be shaped accordingly to complement the differently shaped part. As a result of its complementary shaping, leak testing device (200) fits suitably upon pipe (294) to be tested. Leak testing device (200), however, does not form an airtight seal with pipe (294). As can be seen in FIG. 10, leak testing device (200) comprises at least one attachment magnet cavity (240). Attachment magnet cavity (240) may be sized to retain a magnet therein. Alternatively, a magnet may be attached to attachment magnet cavity (240) through use of a glue, staple, screw, or other suitable retaining mechanism as would be apparent to one of ordinary skill in the art in view of the teachings herein. As a result of attachment magnet cavity (240) and one or more magnets contained therein, leak testing device (200) may be easily attached to pipe (294) in such a way that leak testing device (200) maintains a somewhat firm grip on pipe (294).

As shown in FIG. 10, which shows the inside of leak testing device (200), leak testing device (200) comprises part cavity (218) formed within leak testing device (200) and purge channel (211) extending around part cavity (218). Purge channel (211) comprises a plurality of purge ports (224) within purge channel (211) where purge ports (224) extend through purge channel (211), such that purge ports (224) may be used to flow a purge gas into purge channel (211).

Figure 8:
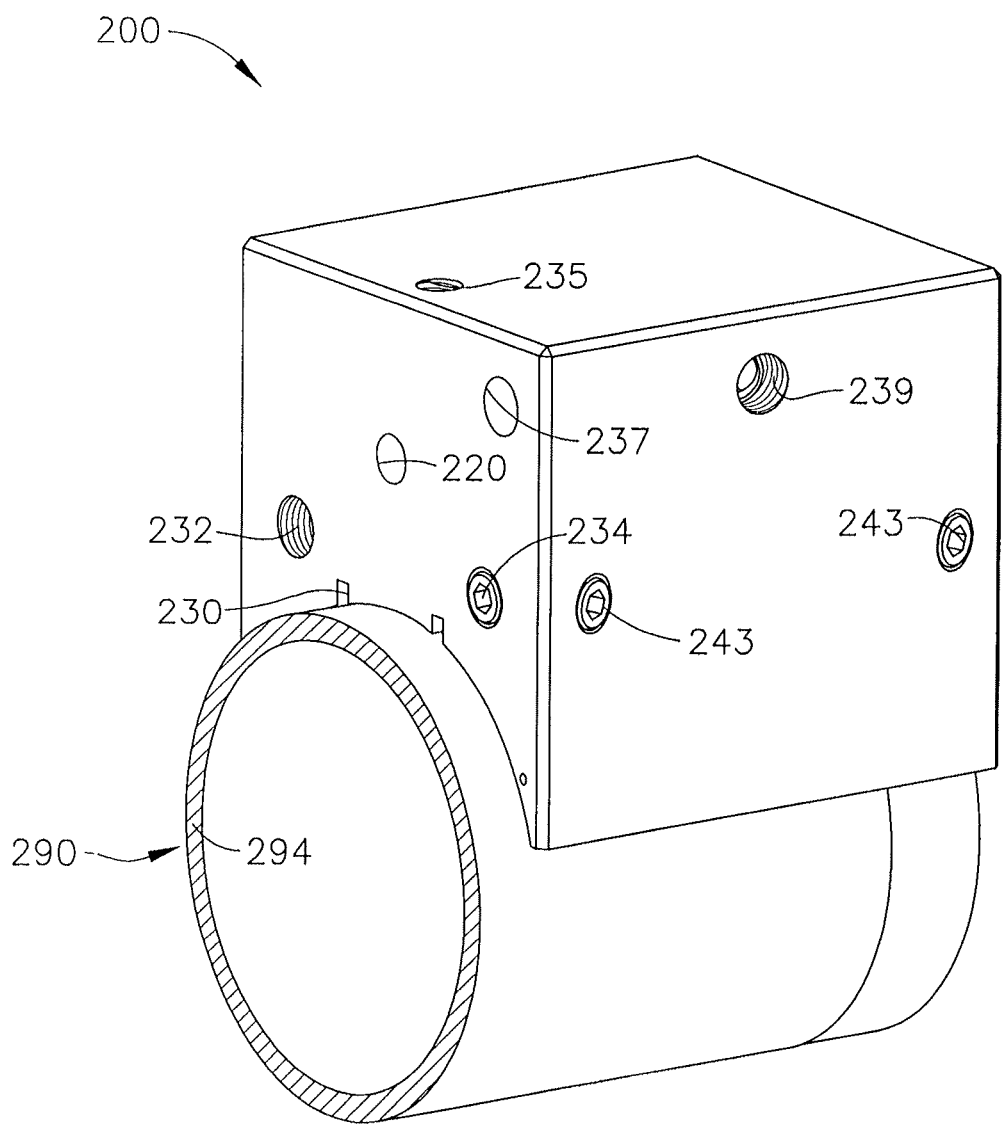
FIG. 8 depicts a perspective view of an alternative embodiment of a leak testing device constructed in accordance with the teachings of the present invention with a part to be leak tested.

Purge ports (224) may function in a substantially similar way as described in FIGS. 1-7. Generally speaking, purge ports (224) may be in fluid communication with a purge gas source. As can be seen in FIG. 8, at least one purge inlet (232) is positioned on leak testing device (200) and may be in fluid communication with a plurality of purge ports (224). As a purge gas is urged through at least one purge inlet (232), the purge gas also flows through plurality of purge ports (224) in a generally continuous manner. Thus, plurality of purge ports (224) may be used to facilitate applying a positive pressure of purge gas when leak testing device (200) is placed upon pipe (294) and purge gas is supplied. The continuous flow of purge gas through plurality of purge ports (224) thus purges atmospheric gas from leak testing device (200). To the extent that tracer gases may be found in atmospheric gas, it will be appreciated that purging the atmospheric air from leak testing device (200) will reduce the overall amount of tracer gas contained in leak testing device (200). Furthermore, the positive pressure of purge gas enables leak testing device (200) to prevent atmospheric air from re-rentering leak testing device (200). If additional inlets for purge gas are needed, one or more of purge plugs (234, 243) may be removed. As can be seen in FIGS. 10-13, removing purge plugs (243) reveals additional purge inlets (245) to which a purge gas source may be connected to supply additional purge gas to leak testing device (200). In the illustrated embodiment, two purge plugs (243) are removed, but it will be appreciated that any suitable number of purge plugs (243) may be removed. For example, the user may wish to remove a single purge plug (243) or any other suitable number as would be apparent to one of ordinary skill in the art in view of the teachings herein. Additional purge inlets (245) may also serve as crossover channels in communication with at least one purge inlet (232). Leak testing device (200) also comprises at least one purge vent (230) extending outward from purge channel (211). At least one purge vent (230) may function as exit points for purge gas being supplied to purge channel (211), which allows purge gas to flow from at least one purge inlet (232), to plurality of purge ports (224), to purge channel (211), to at least one purge vent (230). This continual flow of a purge gas through these structural elements allows the purge gas to flow without undesirable gas build up within leak testing device (200). Prior to taking a reading, calibration inlet (239) may be injected with a purge gas from calibration port (237) to zero the sniffer probe (not shown).

Figure 9:
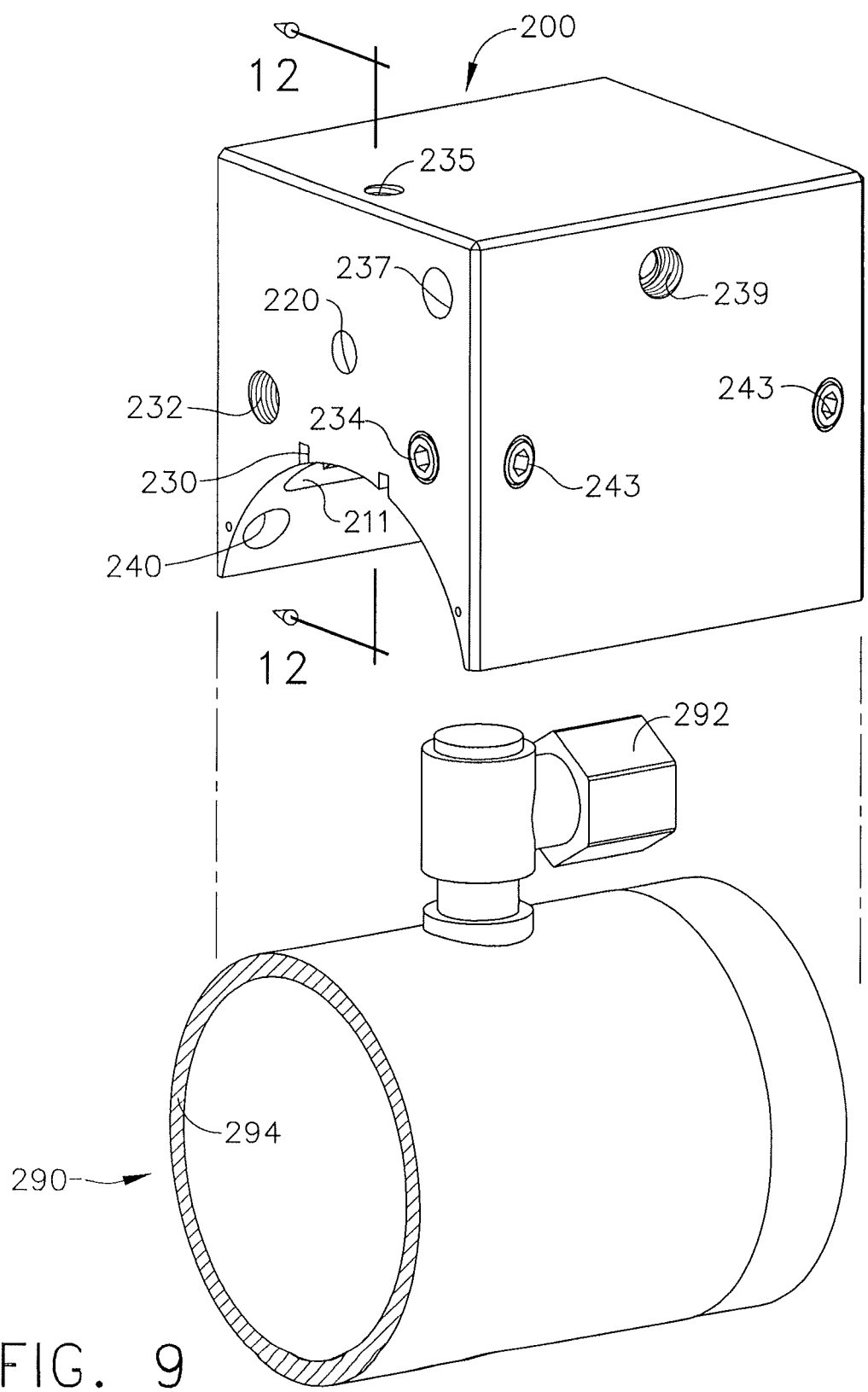
FIG. 9 depicts a perspective view of the leak testing device of FIG. 8 with the leak testing device lifted off of the part to be leak tested.
Figure 11:
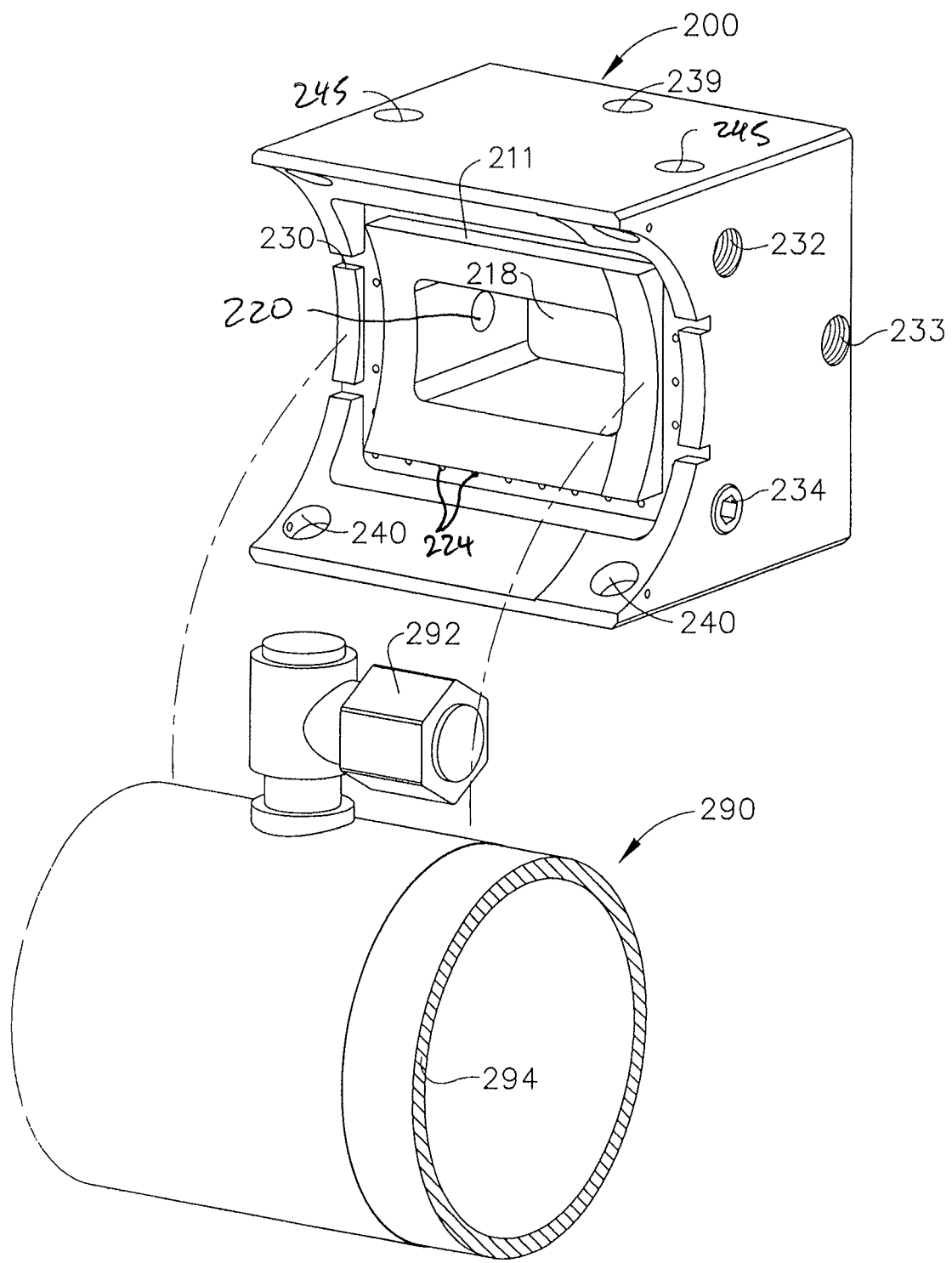
FIG. 11 depicts a perspective view of the leak testing device of FIG. 8 with the leak testing device lifted off of the part to be tested and rotated to show the bottom of the leak testing device.

In FIG. 11, leak testing device (200) is illustrated from a different angle showing sample lumen (220), which was seen in FIGS. 8-9, extending through leak testing device (200) and terminating in part cavity (218). Sample lumen (220) is in fluid communication with sample inlet (235). Sample lumen (220) is lined with isolating ring (221)—seen for example in FIG. 13—to ensure that sample lumen (220) remains only in direct fluid communication with sample inlet (235) and part cavity (218). Thus, a sniffer probe or other lumen may be inserted into sample lumen (220) to sample air from part cavity (218) to determine if any of a tracer gas exists in part cavity (218) once a tracer gas is supplied to part (290) to determine if any leaks exist in part (290). Furthermore, leak testing device (200) comprises part cavity purge inlet (233) which may receive a purge gas through, for example, a gas conduit.

Figure 12:
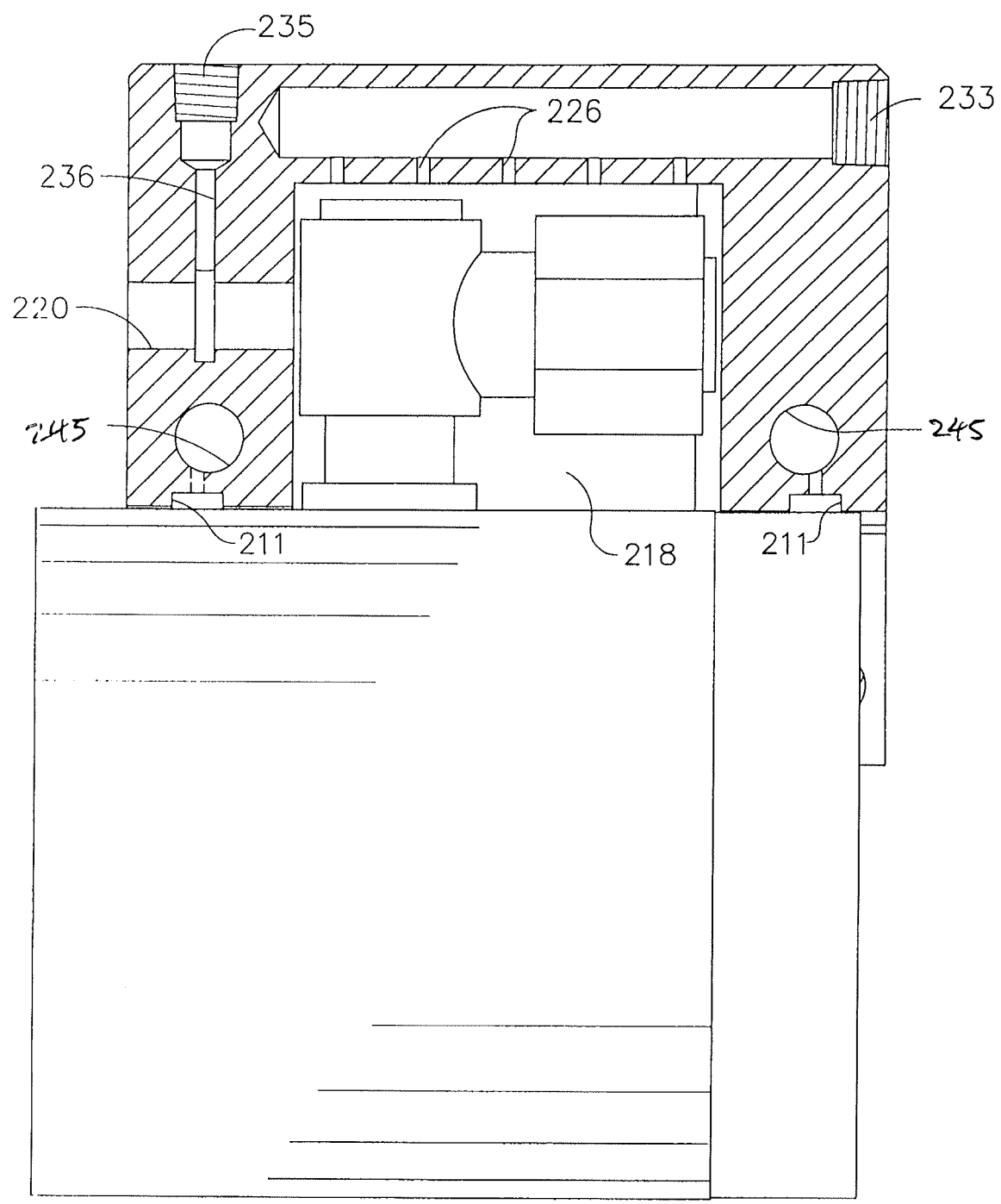
FIG. 12 depicts a partially cross sectional side view of the leak testing device of FIG. 8 adjacent a part to be leak tested.
Figure 13:
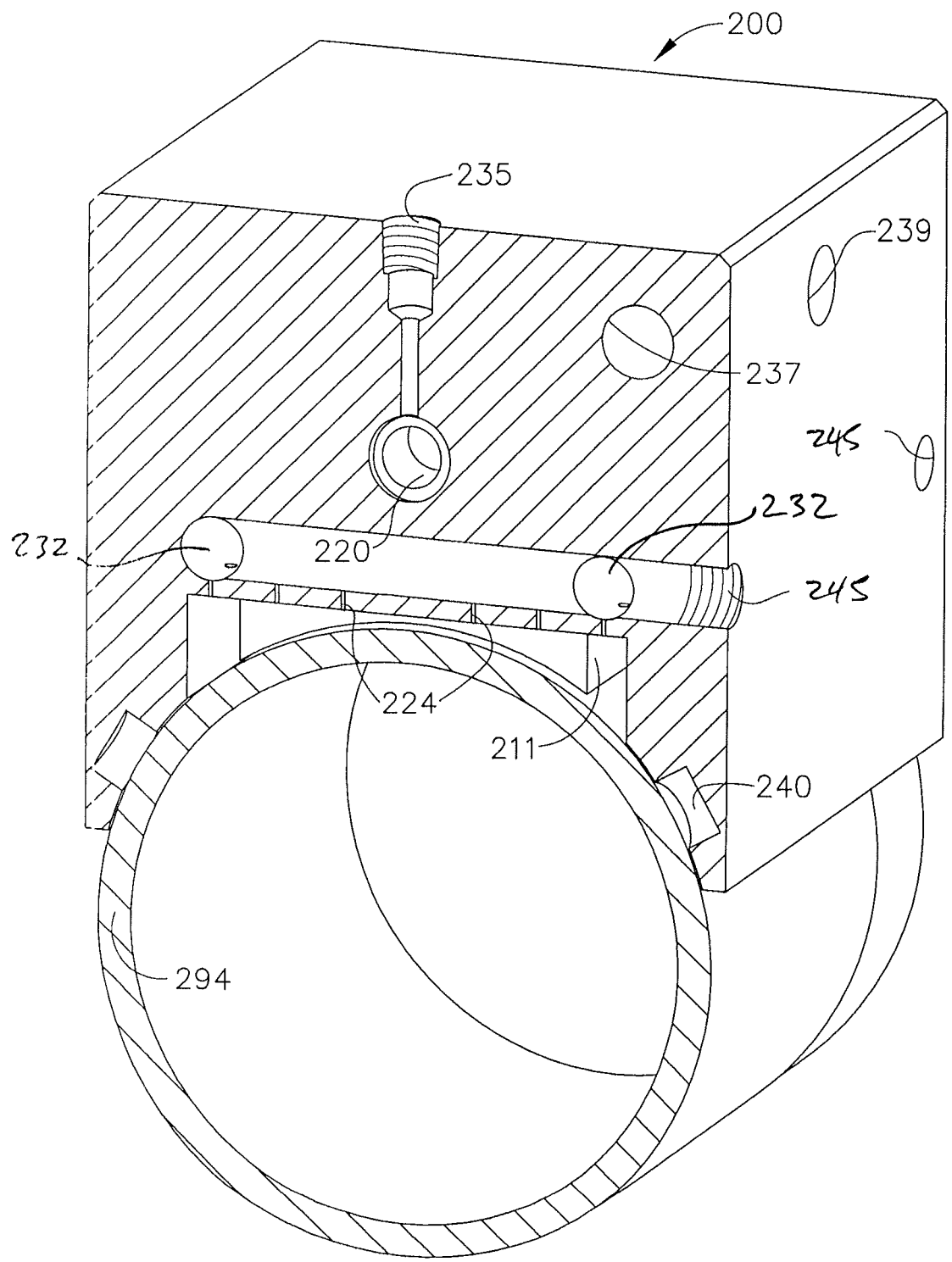
FIG. 13 depicts a cross sectional perspective view of the leak testing device of FIG. 8 adjacent a part to be leak tested.

FIGS. 12-13 shows a side, cross sectional view of leak testing device (200) as it relates to the various passageways in leak testing device (200). At least one purge inlet (232) is shown in FIG. 13. In the illustrated embodiment, one purge inlet (232) is shown. However, any suitable number of at least one purge inlets (232) may be used as would be apparent to one of ordinary skill in the art in view of the teachings herein. At least one purge inlet (232) comprises an internal threading such that a conduit for providing a purge gas may engage at least one purge inlet (232) by engaging complementary threading. However, any suitable means for engaging at least one purge inlet (232) with a gas conduit may be used as would be apparent to one of ordinary skill in the art. At least one purge inlet (232) is shown to provide a direct line of fluid communication with vacuum lumen (220) through a cavity lumen (236). In the illustrated embodiment, at least one purge inlet (232) is also in fluid communication with purge channel (211) such that supplying a purge gas to at least one purge inlet (232) will also supply purge gas to purge channel (211). Additionally, part cavity purge inlet (233) is in fluid communication with part cavity (218) through a plurality of part cavity purge ports (226). Thus, a purge gas may be supplied through plurality of part cavity purge inlet (233) to supply the purge gas to part cavity (218). In the illustrated embodiment, plurality of part cavity purge ports (226) comprises five inlets; however, any suitable number of plurality of part cavity purge ports (226) may be used as would be apparent to one of ordinary skill in the art in view of the teachings herein. It will be appreciated that the number and positioning of purge ports (226) may be adjusted to control the flow of purge gas through part cavity (218). For example, a higher concentration of plurality of part cavity purge ports (226) may be placed in one position to facilitate sweeping of gas within part cavity (218) toward sample lumen (220) for sampling.

Figure 14:
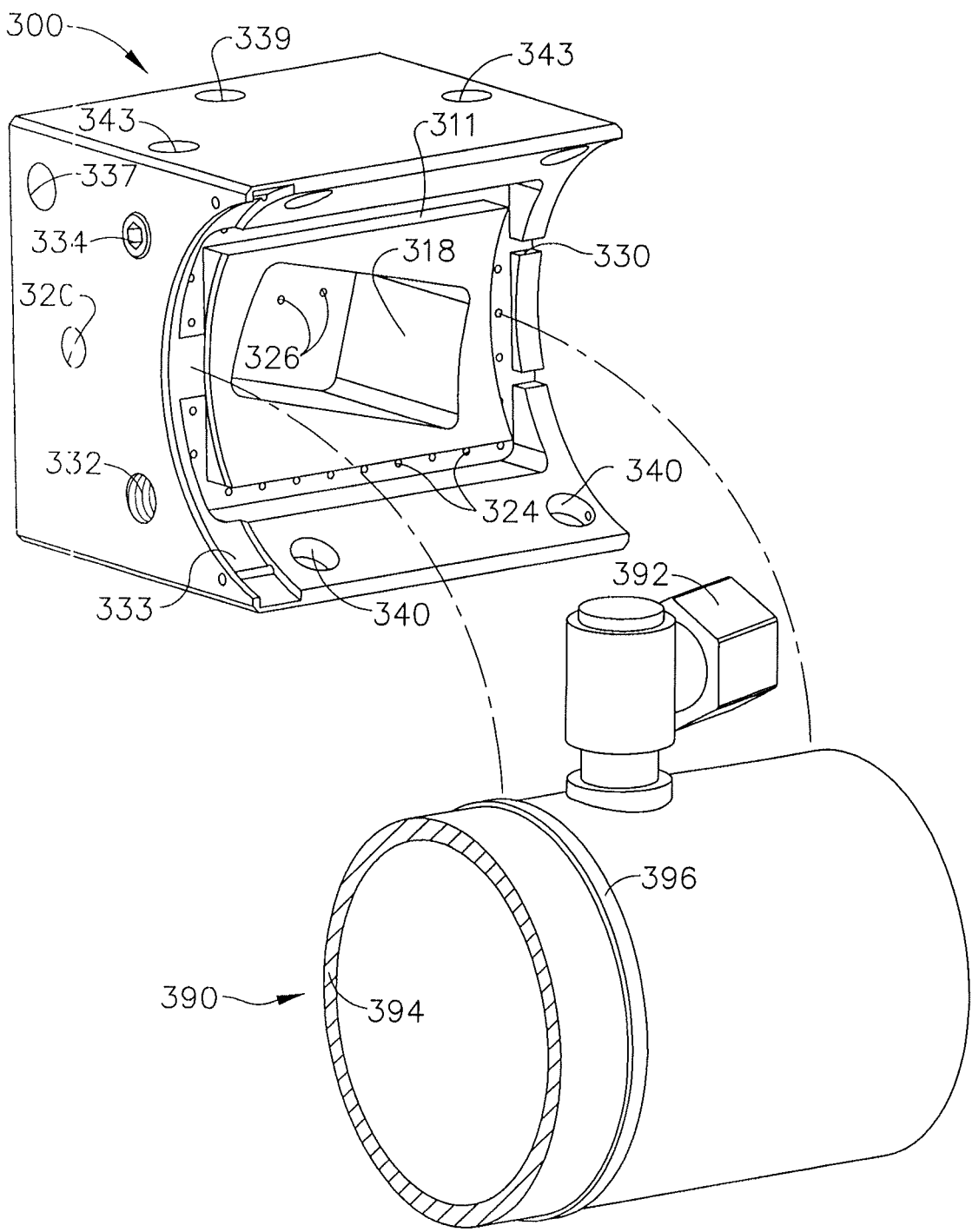
FIG. 14 depicts a perspective view of an alternative embodiment of a leak testing device with the leak testing device lifted off of the part to be leak tested and rotated to show the bottom of the leak testing device.

FIG. 14 shows yet another alternative embodiment of leak testing device (300) having angled part cavity (318). Leak testing device (300) overall is substantially similar to leak testing device (200) depicted in FIGS. 8-13. In the embodiment shown in FIG. 14, part cavity (318) is formed in leak testing device (300) at an angle since the valve (392) being leak tested is positioned at an angle. Of course, other suitable shapes and orientations for part cavity (318) may be used as would be apparent to one of ordinary skill in the art in view of the teachings herein.

Leak testing device (300) comprises a rectangular block-shape having a cylindrical cut out. Leak testing device (300) comprises at least one purge inlet (332) wherein a purge gas may be supplied either directly or through a conduit for delivering a purge gas. Leak testing device (300) further comprises at least one magnet attachment cavity (340) able to hold at least one magnet, which may be used to attach leak testing device (300) to part (290) for leak testing. Leak testing device (300) comprises at least one purge plug (334), wherein at least one purge plug (334) may be used to selectively block a purge gas from escaping leak testing device (300). Leak testing device (300) further comprises at least one purge vent (330). In the illustrated embodiment, leak testing device (300) furthermore comprises ridge (333) to accommodate welded portion (396) of part (390) to be leak tested. As can be seen by ridge (333), leak testing device (300) may comprise a variety of shapes to enable leak testing device (300) to fit a variety of parts.

As noted with other embodiments of leak testing device (300), leak testing device (300) comprises access port (320) for inserting a vacuum lumen or a sniffer probe for detecting a tracer gas. Also, as noted in other embodiments of leak testing device (300), leak testing device (300) comprises plurality of purge ports (324) for releasing a purge gas as well as at least one cavity purge port (326) for supplying a purge gas to part cavity (318).

Having shown and described various embodiments in the present disclosure, further adaptations of the methods and systems described herein may be accomplished by appropriate modifications by one of ordinary skill in the art without departing from the scope of the present invention. Several of such potential modifications have been mentioned, and others will be apparent to those skilled in the art. For instance, the examples, embodiments, geometries, materials, dimensions, ratios, steps, and the like discussed above are illustrative and are not required. Accordingly, the scope of the present invention should be considered in terms of the following claims and is understood not to be limited to the details of structure and operation shown and described in the specification and drawings.

What is claimed is:

1. A leak testing device comprising:
   (a) a body portion including an outer wall and defining a cavity formed therein, wherein the cavity is configured to receive at least a portion of a part to be leak tested, wherein the body portion further comprises a channel disposed between the outer wall and the cavity, wherein the channel extends around at least a portion of the cavity, wherein the body portion further comprises at least one fluid port configured to communicate a purge gas to the channel.

2. A system for leak testing a part, comprising:
   (a) The leak testing device of claim 1; and
   (b) a purge gas supply in fluid communication with the at least one fluid port, wherein the purge gas supply is configured to supply a purge gas through the at least one fluid port, wherein the purge gas is operable to purge the channel of the body portion of at least a portion of an atmospheric gas contained in the channel.

3. The system of claim 2, wherein the purge gas comprises nitrogen.

4. The system of claim 2, wherein the purge gas supply is operable to deliver a continuous flow of purge gas to the body portion.

5. The system of claim 2, wherein the purge gas supply is operable to deliver the purge gas at multiple flow rates.

6. The leak testing device of claim 1, wherein the body portion comprises a first half and a second half, wherein the first half includes a first portion of the cavity and a first portion of the channel, wherein the second half includes a second portion of the cavity and a second portion of the channel.

7. The leak testing device of claim 6, wherein one of the first half or the second half comprises at least one first engagement feature, wherein the other of the first half or second half comprises at least one second engagement feature, wherein the at least one first engagement feature is configured to engage the at least one second engagement feature to couple the first half and the second half together.

8. The leak testing device of claim 1, wherein the body portion includes a lumen extending from the cavity to an outer wall of the body, wherein the lumen is configured to receive a sniffer probe for detecting tracer gas present in the cavity.

9. The leak testing device of claim 1, wherein the channel extends fully around a periphery of the cavity.

10. The leak testing device of claim 1, further comprising a plurality of openings along at least a portion of the channel, wherein the plurality of openings are configured to deliver a portion of purge gas to the channel via the at least one fluid port.

11. The leak testing device of claim 10, wherein the plurality of openings are configured to deliver a curtain of purge gas operable to prevent atmospheric gas from entering the cavity.

12. The leak testing device of claim 1, wherein the body portion further comprises a calibration inlet, wherein the calibration inlet is in fluid isolation from at least one of the cavity and the channel.

13. The leak testing device of claim 1, wherein the cavity is shaped to fit the part to be leak tested.

14. The leak testing device of claim 1, wherein the body portion comprises two halves configured to enclose the part to be leak tested.

15. The leak testing device of claim 1, wherein the body portion defines a lumen for receiving piping for leak testing, wherein the lumen extends through a portion of the channel, wherein the lumen is in communication with the cavity.

16. A purging device comprising at least one body portion configured to receive at least a portion of a part inserted into the at least one body portion for leak testing, wherein the at least one body portion defines at least one part cavity portion formed within the at least one body portion, wherein the body portion comprises at least one purge inlet that is in fluid communication with a purge channel positioned within the at least one body portion, wherein a positive pressure is applied within the purge channel to remove atmospheric gas from the purge channel, wherein the at least one body portion further defines at least one opening formed within the at least one body portion, wherein the at least one opening extends outwardly from the purge channel and is configured to provide fluid communication between the purge channel and atmospheric air.

17. The purging device of claim 16, further comprising a purging gas source operable to deliver a flow of purging gas through the at least one purge inlet to the at least one purge channel.

18. A method of leak testing a part using a leak testing device, wherein the leak testing device defines at least one cavity formed therein, wherein the leak testing device further comprises a channel extending around at least a portion of the cavity, wherein the leak testing device further defines at least one inlet port in communication with the channel, the method comprising:
   (a) inserting at least a portion of a part to be leak tested such that the at least one cavity surrounds at least a portion of the part;
   (b) delivering a purging gas through the at least one inlet port into the channel to purge
   at least a portion of atmospheric gas contained within the channel from the channel;
   (c) applying a continual flow of the purging gas to develop a positive pressure within at least a portion of the channel that prevents atmospheric tracer gas from entering the at least one cavity.

19. The method of claim 18, further comprising a step of sensing the presence of tracer gas in the at least one cavity of the leak testing device after step (c), wherein the step of sensing the presence of tracer gas in the at least one cavity further comprises providing tracer gas into the part to be leak tested and inserting a portion of a sniffer probe into the at least one cavity.

20. The method of claim 18, wherein the leak testing device further comprises a second inlet port in communication with the at least one cavity, and the method of claim 18 further comprises a step of delivering a purging gas through the second inlet port into the at least one cavity to purge at least a portion of atmospheric gas contained within the at least one cavity from the at least one cavity.

* * * * *